United States Patent
Walsh et al.

(10) Patent No.: US 7,376,417 B2
(45) Date of Patent: *May 20, 2008

(54) METHOD AND SYSTEM OF EFFICIENT SPECTRUM UTILIZATION BY COMMUNICATIONS SATELLITES

(75) Inventors: Thomas M. Walsh, Rolling Hills Estates, CA (US); George Hrycenko, Los Angeles, CA (US); William J. Nunan, Manhattan Beach, CA (US); Adam Stone, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 10/759,766

(22) Filed: Jan. 16, 2004

(65) Prior Publication Data
US 2004/0147222 A1  Jul. 29, 2004

Related U.S. Application Data

(63) Continuation of application No. 09/664,940, filed on Sep. 19, 2000, now Pat. No. 6,810,249.

(51) Int. Cl.
*H04Q 7/20* (2006.01)
(52) U.S. Cl. ............... 455/427; 455/12.1; 455/430; 455/13.2
(58) Field of Classification Search ............... 455/427, 455/12.1, 430, 13.1, 431, 13.2, 429, 436
See application file for complete search history.

(56) References Cited

U.S. PATENT DOCUMENTS

| | | | |
|---|---|---|---|
| 4,689,625 A | | 8/1987 | Barmat |
| 5,408,237 A | | 4/1995 | Patterson et al. |
| 5,678,174 A | * | 10/1997 | Tayloe .................. 455/13.1 |
| 5,732,351 A | * | 3/1998 | Olds et al. .................. 455/436 |
| 5,926,758 A | * | 7/1999 | Grybos et al. .............. 455/429 |
| 5,966,371 A | | 10/1999 | Sherman |
| 5,974,316 A | | 10/1999 | Tayloe et al. |
| 6,002,916 A | | 12/1999 | Lynch |
| 6,019,318 A | | 2/2000 | Cellier et al. |

(Continued)

FOREIGN PATENT DOCUMENTS

WO    WO 90/13186    11/1990

OTHER PUBLICATIONS

U.S. Appl. No. 09/611,750, filed Jul. 7, 2000, Wang, Weizheng et al.

(Continued)

*Primary Examiner*—Tan Trinh

(57) ABSTRACT

A satellite system includes a plurality of orbit slots having a first orbital and a second orbital slot. A first satellite occupies a first orbital slot and generates a first set of uniform beams. A second satellite located in a second orbital slot generates a second set of uniform beams. A tiling pattern on the face of the Earth has a plurality of cells, with each of the cells having a defined frequency for communication. The first set of beams and the second set of beams are generated according to parameters to avoid interference between them. The parameters may include satellite orbit separations, beam size, multiplicity of band reuse, and ground station received beamwidth.

15 Claims, 5 Drawing Sheets

U.S. PATENT DOCUMENTS

| | | |
|---|---|---|
| 6,126,116 A | 10/2000 | Cellier |
| 6,150,977 A | 11/2000 | Wilcoxson et al. |
| 6,157,811 A | 12/2000 | Dent |
| 6,173,178 B1 | 1/2001 | Hammill et al. |
| 6,195,037 B1 | 2/2001 | Gross et al. |
| 6,226,493 B1 * | 5/2001 | Leopold et al. ............ 455/13.1 |
| 6,333,924 B1 | 12/2001 | Porcelli et al. |
| 6,512,920 B1 * | 1/2003 | Yaoya ........................ 455/428 |
| 6,714,780 B1 * | 3/2004 | Antonio et al. ............. 455/425 |
| 6,810,249 B1 * | 10/2004 | Walsh et al. ................ 455/427 |
| 7,200,360 B1 * | 4/2007 | Chang et al. ............... 455/13.1 |
| 2001/0007552 A1 * | 7/2001 | Schiff et al. ................ 370/331 |
| 2001/0021195 A1 * | 9/2001 | Miller et al. ................ 370/441 |
| 2002/0061730 A1 * | 5/2002 | Hart et al. .................. 455/12.1 |
| 2002/0132579 A1 * | 9/2002 | Hart et al. .................. 455/12.1 |
| 2004/0147257 A1 * | 7/2004 | Phillips et al. .............. 455/427 |

OTHER PUBLICATIONS

U.S. Appl. No. 09/649,355, filed Aug. 28, 2000, Hagen et al.

* cited by examiner

METHOD AND SYSTEM OF EFFICIENT SPECTRUM UTILIZATION BY COMMUNICATIONS SATELLITES

CROSS-REFERENCE TO RELATED APPLICATION

The present application is a continuation of prior application Ser. No. 09/664,940, filed Sep. 19, 2000 now U.S. Pat. No. 6,810,249, entitled "Method and System of Efficient Spectrum Utilization by Communications Satellites", inventors: Thomas M. Walsh, George Hrycenko, William J. Nunan and Adam Stone, the entire contents of which are incorporated herein by this reference.

TECHNICAL FIELD

The present invention relates to communications satellites, and more particularly, to a coordinated system for satellite networks used to improve frequency reuse.

BACKGROUND ART

Satellites in geostationary orbit (GSO) have been widely preferred for several decades because of economic advantages. In a geostationary orbit, a satellite traveling above the Earth's equator, in the same direction as that in which the Earth is rotating, and at the same angular velocity, appears stationary relative to a point on the Earth. These satellites are always "in view" at all locations within their service areas. Antennas on Earth need to be aimed at a GSO satellite only once; no tracking system is required.

Coordination between GSO satellites generally occurs on a first-come, first-served, basis; such coordination sometimes is facilitated by governmental allocation of designated "slots" angularly spaced according to service type.

Given the desirability of geostationary satellite orbits and technical limits in spacecraft and earth station design, the number of satellites that can effectively serve a given area on the earth using a particular band of operation (e.g., "C-band", or "Ku-band") is limited. While efforts have continued to improve the technology to enhance capacity, governments have on occasion resorted to auctions as a mechanism to assign limited orbital resources where the demand has exceeded the apparent supply. These circumstances have encouraged the development of complex and expensive new systems including those using low Earth orbit (LEO), medium Earth orbit (MEO), and higher frequencies, for example, the Ka band (up to approximately 40 GHz). Growth to higher frequencies is limited by problems of technology and propagation: thus some efforts at expanding satellite applications involve exploitation of the spatial dimension (i.e., utilizing satellite orbits other than the GSO). A host of proposed LEO and MEO systems exemplify this direction.

The recently filed LEO and MEO system applications, however, introduce additional technical complexity and costs that may not be justified in some applications. Frequency coordination and sharing are complicated by the unstructured crisscrossing of the lines of sight of these systems.

In the use of geostationary orbits, objectives in establishing networks is to maximize the independence between satellites. To achieve this, the burden of coordination is placed on the later entrant, to ensure interference-free operation vis-à-vis existing systems. Because of the number of networks in operation, particularly in the heavily utilized C-band and Ku-band, interference-free capacity is very difficult (if not impossible) to coordinate for service areas including the populated land masses. It would therefore be desirable to provide a system for coordinating various satellite operations so that the aggregate communications capacity of all satellites may be improved, and the overall utilization of the resource is increased. It would therefore be desirable to provide a system for coordinating various satellite operations so that the aggregate communications capacity of satellites may be maximized.

SUMMARY OF THE INVENTION

An object of the present invention is to provide a method for maximizing the aggregate capability of geosynchronous communications satellites for accommodating a multiplicity of services and/or providers.

Another object is to enable frequency reuse of spectrum used by geosynchronous satellites in an optimally coordinated manner, accounting for maximum number of requirements within a given band and geographical region.

A typical example of the invention, a satellite system has a plurality of orbit slots having a first orbital slot and a second orbital slot. A first satellite occupies a first orbital slot and generates a first set of beams. A second satellite in a second orbital slot generates a second set of beams. A tiling pattern results in a plurality of cells on the face of the Earth that defines all coverage areas to be served by the plurality of satellites. The beams of each satellite cover cells within its field of view that represent a subset of the overall tiling pattern. Each of the cells has a defined frequency sub-band for communication and is covered by a beam. The tiling pattern is generated in a way that allows frequency reuse, provides contiguous coverage, and minimizes interference between the all satellites. The key parameters in determining interference and reuse are cell size and the related beamwidth, satellite arc spacing along with the related Earth station beamwidth, and the frequency reuse scheme. Other embodiments of this concept include more than two orbital positions (or "slots").

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
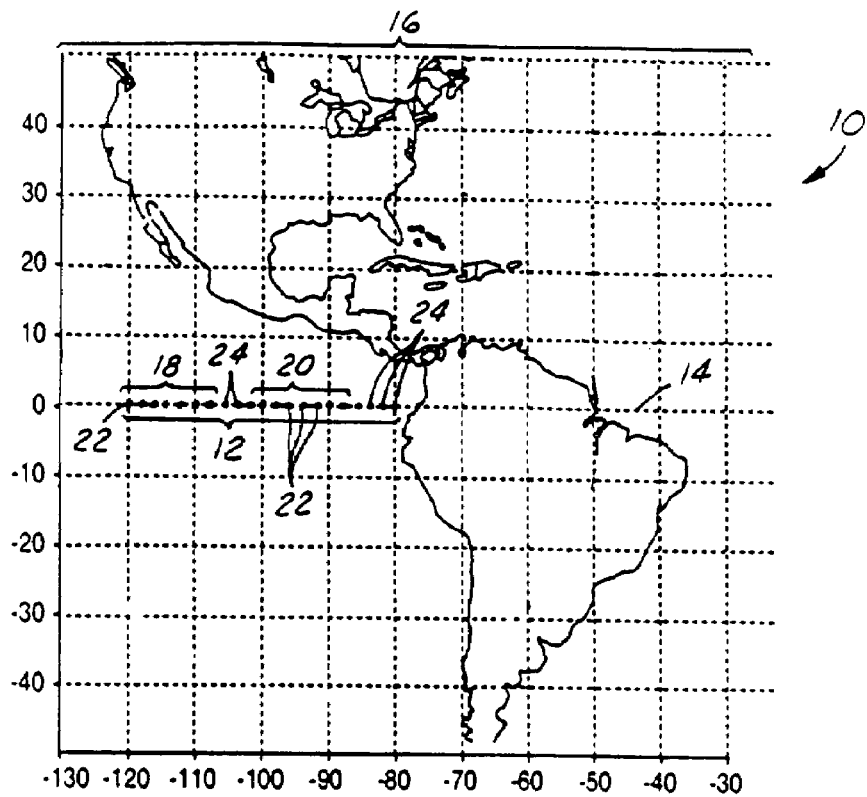
FIG. 1 is a map showing geostationary satellites in equally-spaced orbits on a portion of the GSO arc.

The present invention is illustrated herein in terms of a system of satellites distributed along a portion of the GSO arc using a tiling pattern covering a portion of the Earth. However, it is to be understood that the invention may also be used with non-GSO satellites. Also, the invention could ultimately be applied to all future GSO satellites. Thus, as GSO satellites are replaced, the teachings of the present invention may be employed to promote frequency reuse and coordinated operation with the replacement satellites.

The essence of this invention is the establishment of relationships between satellites to maximize spectrum and orbit utilization. These relationships are particularly applicable to the "Fixed Satellite Service" and the "Broadcasting Satellite Service" as defined in the Radio Regulations of the International Telecommunications Union; however, other satellite services may employ these concepts. As described below, optimum relationships are defined in terms of the key parameters of orbit arc separation, earth station and space station antenna beamwidths, and earth cell coverage dimensions, that results in maximization of overall communications capacity.

This concept is developed under the cooperative constraints of band segmentation, band reuse, a specification of maximum satellite antenna size, specification of minimum earth terminal antenna size, and a given minimum relative signal strength in the presence of noise and interference that is required for acceptable communication of information in the band. The relative signal strength is commonly denoted C/(N+I), and represents the intended signal power (C) divided by the sum of noise power due to various natural thermal processes (N) and power due to all interfering signals (I) occupying the same frequency band as the intended signal.

All satellites within a given orbital arc operating in the subject frequency band will operate subject to the condition of having similar performance parameters. Enforcing a near uniform signal power, and a uniform C/(N+I) requirement for all beams sharing a band leads to a higher overall communication capacity than can be realized otherwise.

Decreasing the extent of geographical overlap between beams sharing the same or adjacent spectral assignments (i.e., decreasing the signal level outside the intended service area) reduces interference between the systems (networks). Minimizing the size and maximizing the number of beams serving a given region increases the frequency re-use and consequently the overall communication capacity to be derived from a given band. One attractive method of satisfying these competing objectives of minimizing interference while maximizing overall capacity is use of a repeating, geometrical arrangement of cells in which the cell coverage areas may be said to "tile" the geographic area to which satellites provide communication service. This arrangement of cells defines the tiling pattern. Each of the plurality of beams of a satellite is designed to cover a particular cell of the tiling pattern.

This frequency re-use scheme has been previously applied to individual satellites. In this invention, the frequency re-use scheme is extended to apply to a number of satellites in a coordinated system. The difference in the present invention is that the compatibility between all satellites and their respective earth terminals is a-priori built into the coordinated system of communications satellites where all satellites of participating networks can operate above an acceptable (N+I) threshold.

An increase in satellite antenna size makes possible a decrease in the size of beam that it can produce, and a single antenna can produce many beams. The diameter of the antenna is dictated by the size of the smallest beam, and not by the number of beams it must produce. Thus, larger satellite antennas (although typically more expensive than smaller ones) decrease beam size and increase aggregate communications capacity.

Similarly, an increase in earth terminal antenna size decreases the required separation distance between satellites using the same frequency band. This separation distance can be quantified as a GSO slot spacing, which is the difference in longitude of two adjacent geostationary orbit positions.

By selecting the earth station antenna size to minimize possible adjacent satellite interference, it is possible to re-use the full spectrum from each GSO slot; therefore, the smaller the GSO slot spacing, the more usable GSO slots exist, and the greater the overall communication capacity.

The present invention does not attempt to define the best size for antennas of satellites or earth terminals. Likewise, it does not attempt to define a unique best value for C/(N+I). These choices entail economic judgments regarding the relative value of overall capacity or reduced probability of data transmission errors. Instead, this invention shows how to maximize the overall communication capacity of the coordinated system for any specified values of satellite beam size and GSO slot spacing, while achieving a specified value of C/(N+I).

Figure 6:
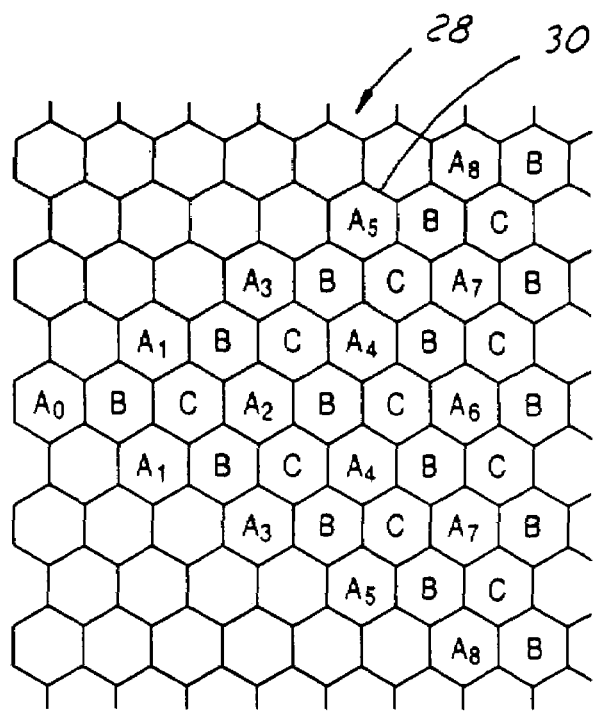
FIG. 6 is a graphical representation of a tiling pattern from the perspective of a satellite and the associated frequencies resulting from a scheme that has 3 sub-bands.
Figure 7:
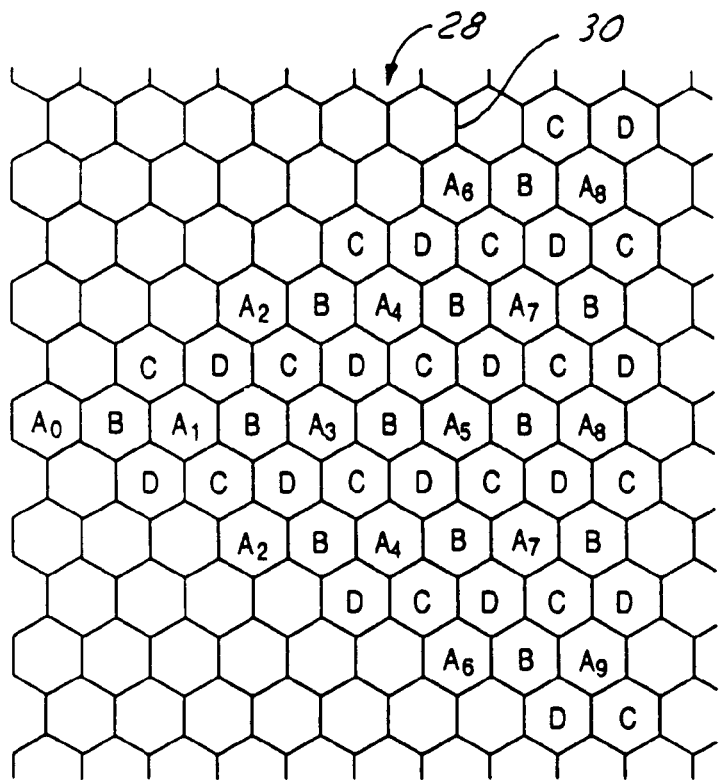
FIG. 7 is a graphical representation of a tiling pattern demonstrating a reuse scheme that uses four sub-bands.
Figure 8:
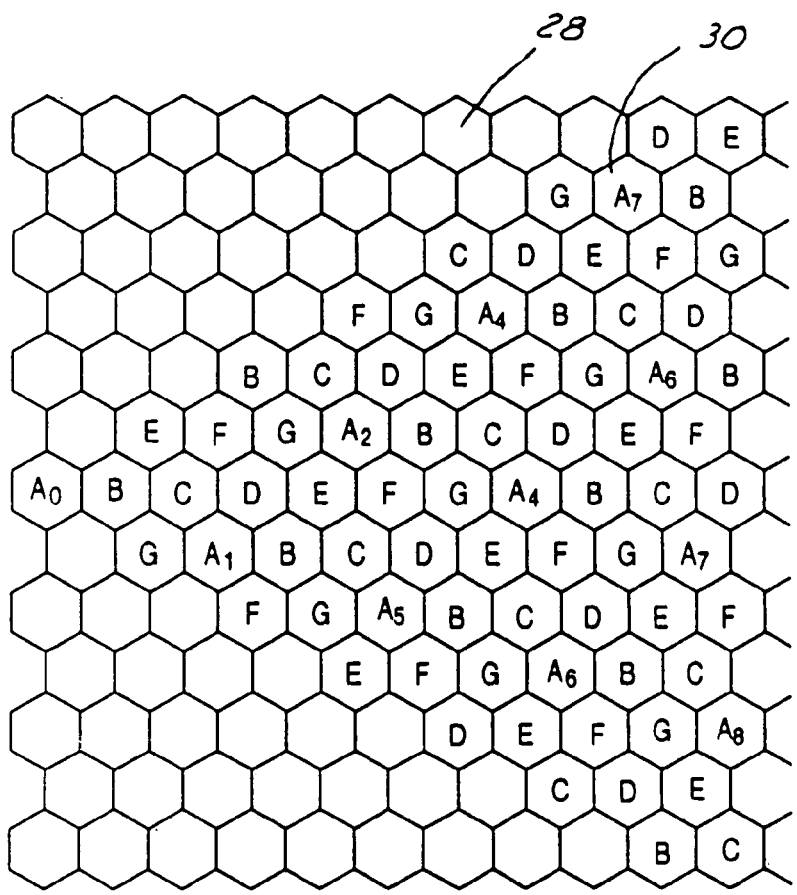
FIG. 8 is a graphical representation of a tiling pattern using a reuse scheme that uses seven sub-bands.

For a given choice of antenna sizes, this frequency assignment method generates a set of frequency reuse schemes, the first three of which are illustrated in FIGS. 6 through 8. The reuse scheme defines the number of distinct sub-bands into which the available frequency band is divided, and how those sub-bands are assigned to the various cells covering the region. Each figure illustrates a particular reuse scheme, for which the number of sub-bands is three, four, and seven respectively. Increasing the number of sub-bands increases CI(N+I), but decreases the communication bandwidth to each cell or it can be used to reduce the antenna size.

C/(N+I) also depends on the proper match of beam size to cell size, where beams are characterized by antenna patterns. Antenna patterns mathematically describe the degree to which the power radiated by an antenna varies over the field of view of the antenna as a function of angle. Typically, the power radiated is maximum at the center of the beam, and decreases in proportion to the square of the angular distance from the center over a restricted radius of the main beam.

The beamwidth is typically defined as the angular distance between points on the antenna pattern at which the power falls to one half of its peak value.

In a region of the antenna pattern that is well beyond off beam peak, the half-power beamwidth, there is a distribution of rapid power variations as a function of angle, known as "sidelobes"; these features of realistic antenna patterns also influence the achievable C/(N+I).

Within each beam there is a region to which that beam provides service, and which is referred to as a service area. Outside the service area is a region into which the beam projects significant amounts of radio frequency power, but in which the beam cannot guarantee service at or above the minimum specified C/(N+I). Thus, power which a given beam deposits outside its target cell (or service area) is a loss and can contribute to interference power (I) in neighboring cells.

The choice of optimum cell size for a given beam size involves a trade-off: increasing the cell size relative to the beam diameter reduces the interference power that a beam generates in neighboring cells, and likewise reduces the interference that those neighboring cells generate in the cell in question. This is an advantage for communication at or near the center of the cell; however, every point within each cell must receive the intended signal at or above the specified C/(N+I). At the periphery of a cell that is larger than the half-power beamwidth, the intended signal power (C) is less than half that at the center. Changing the cell size relative to the given half-power beamwidth therefore varies both the signal strength and the interference.

For each reuse scheme and antenna pattern combination, there exists a cell size relative to a desired beam size that maximizes C/(N+I). The requirements of the quality of communication service to which this assignment method is being applied will determine which of the available reuse schemes is most appropriate, depending on the relative importance of the width of the sub-bands versus achievable C/(N+I).

A key feature of this invention is that each defined beam can be assured of providing its intended coverage area (cell) service at or above the specified C/(N+I), regardless of whether none, some, or all of the other beams in the coordinated system are active, provided that any active beams do not exceed their constraints on size, position, or power per unit frequency. Other factors include earth station sides and the beamwidth and satellite spacing.

Figure 2A:
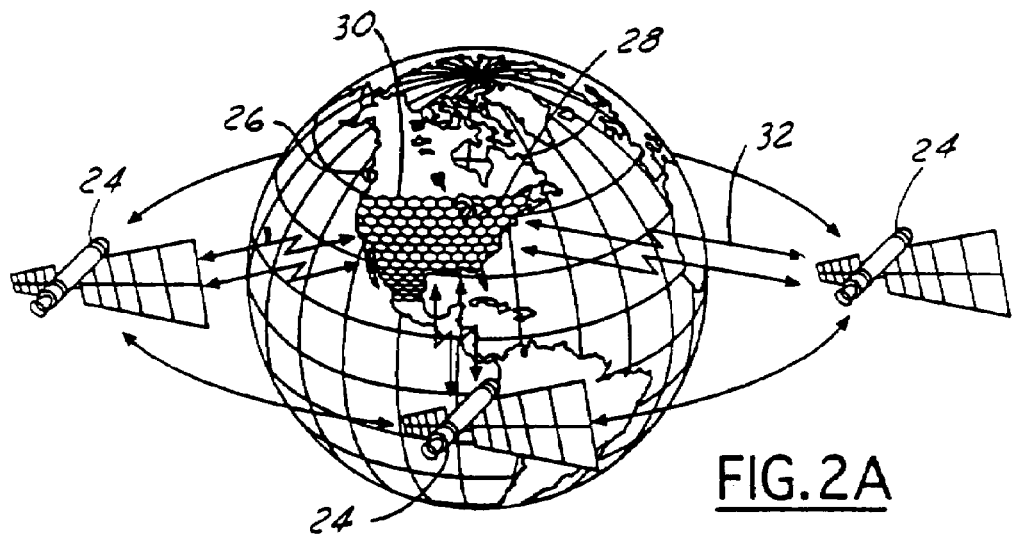
FIG. 2A is a perspective view of a plurality of GSO satellites positioned above the Earth, and projecting beams upon the surface of the Earth, according to the single tiling pattern.

Referring now to FIGS. 1 and 2A, a map 10 shows a portion of the Earth, with possible geostationary satellite locations or slots 12, of the present invention, positioned with equal spacing over the equator. The slots 12 provide one of the defined relationships of the present invention between satellites 24 covering the same geographic area.

A coordinatable system of the present invention, is generally indicated by reference numeral 16. Coordinatable system 16 includes a first satellites 18 and a second satellites 20. Other satellites not belonging to the system of the present invention 22 may be located on GSO arc 14. As will be further described below, the operating parameters of the first satellite 18, and the second satellite 20, are coordinated by the uniformly defined relationships of the present invention. Other satellites 22 may be accommodated at a loss of spectrum efficiency. First satellite 18 and second satellite 20 are generally represented by reference numeral 24.

Referring now to FIG. 2A, a plurality of GSO satellites 24 are positioned at an altitude of over 35,000 kilometers above the Earth on a plane which intersects the equator, each covering the same geographical area.

A landmass 26 is shown having a tiling pattern 28 extending thereacross. Tiling pattern 28 may also extend across the entire surface of the Earth. Tiling pattern 28 is formed of a number of cells 30. Satellites 24 generate beams 32. As the distance from the equator increases, the size of cells 30 projected onto the Earth, increases to reflect the natural tendency of GSO satellite spot-beam footprints to be larger further away from the equator in terms of earth surfaces that are intersected. This allows the satellites to be configured with antenna elements that generate uniform size beams.

One advantage of each satellite generating the same size beams allows an orbital spare to be positioned to replace any satellite that becomes inoperable in orbit.

Figure 2B:
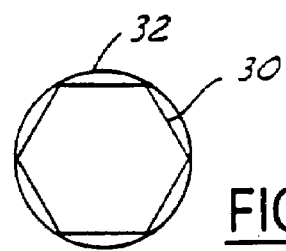
FIG. 2B is an enlarged view of a cell and the associated beam according to the present invention showing that cells provide contiguous coverage.

Referring now to FIG. 2B, each cell 30 of the tiling pattern, thus, approximates the circular or elliptical beam patterns 32 generated by satellites 24. Cell 30 is preferably a hexagon. A hexagon is preferred over another polygon such as a square, since a square has more spillover than a hexagon when a circle is circumscribed about its perimeter.

Figure 3:
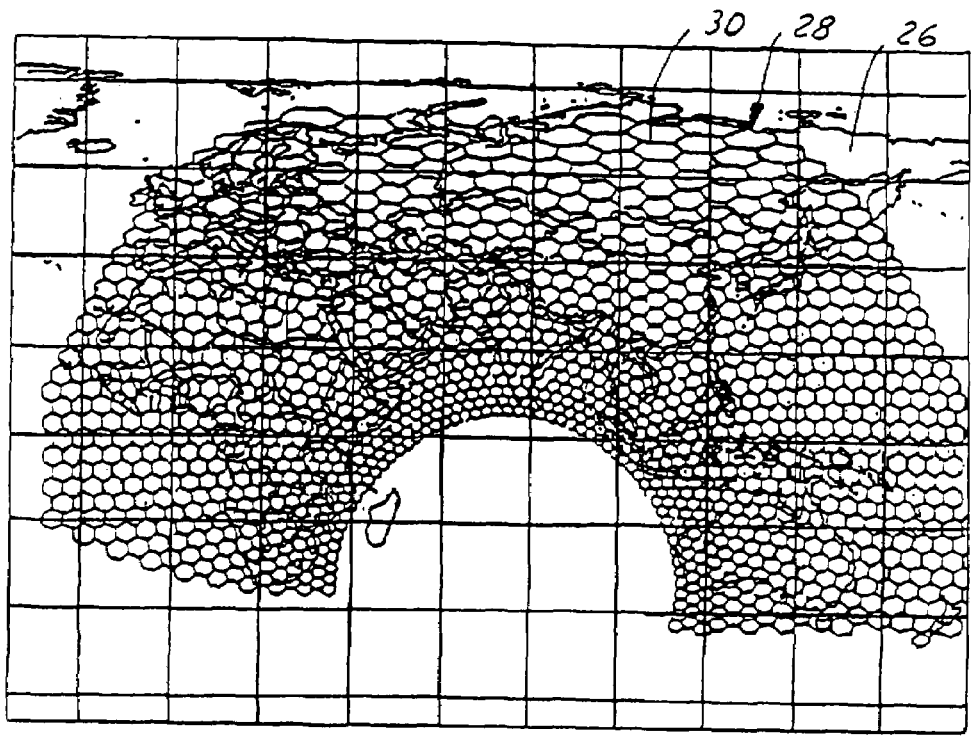
FIG. 3 is a map showing one embodiment of a tiling pattern that accommodates 0.5° beams.

Referring now to FIG. 3, a complete tiling pattern 28 is illustrated extending across the continents of Africa, Europe and Asia using 0.5° beamwidths.

By cellularization of a service area, a high degree of spectrum reuse may be achieved. As illustrated, the coverage area is divided into a set of regular cells. The regular cells, as illustrated, are hexagonal in form. The hexagons intersection of the earth's surface vary in size over the coverage area. That is, as latitude is increased, the size increases proportionally.

One advantage of a hexagonal grid is that only three cells meet at each vertex, rather than four as in a square grid. Each hexagonal cell touches only six neighboring cells while a square would touch eight. The hexagonal cell structure has a higher capacity than a square grid with the same cell area.

Figure 4:
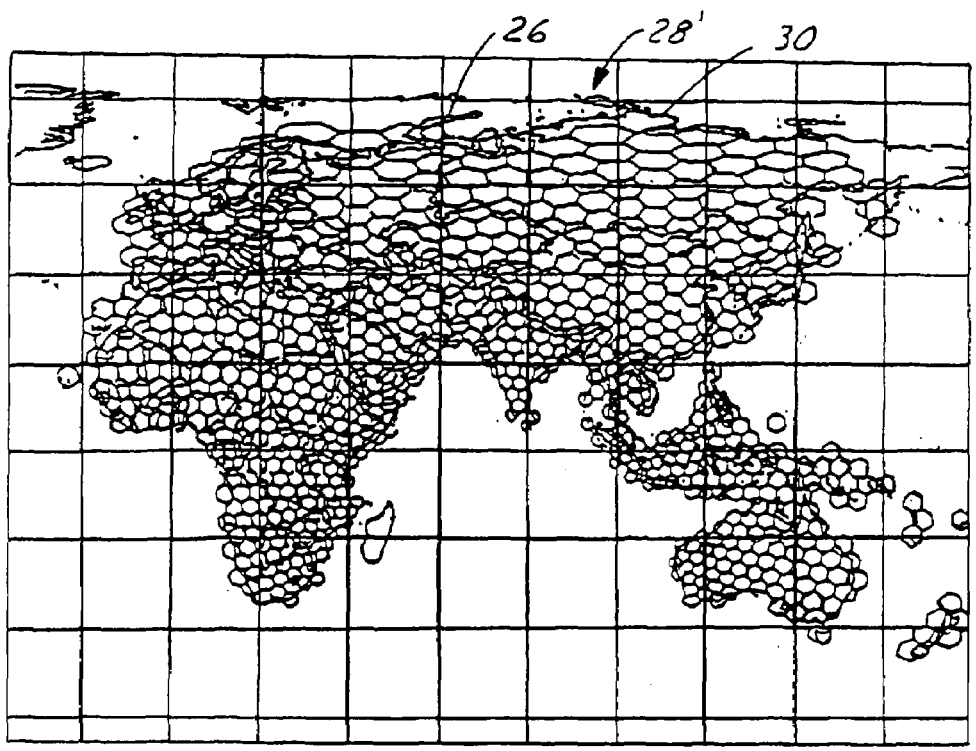
FIG. 4 is a map showing the tiling patterns that omits cells over the oceans.

As indicated in FIG. 3, the beam pattern 28 wastes a large amount of capacity over the oceans. In FIG. 4, the cells over the ocean have been excluded from that of FIG. 3. This reduces the interference on operating cells from cells over the ocean and reduces power consumed by the satellite. It should be noted that tiling pattern 28' in FIG. 4 does not match the boundaries of the countries. In a departure from typical satellite service planning, the present tiling pattern uses several small beams to cover a country even when it is entirely accessible from a single orbit slot using a single beam. Coverage of a particular country may be constructed as a combination of all cells which touch its territory. Unless the country is too large to be entirely visible from one orbit slot at a practical elevation angle, all of the beams illuminating those cells could originate from a single orbit slot. If a country chose to transmit the same programming to all of its cells, they could use a single uplink signal which the satellite payload would translate to a different downlink frequency for each cell. The country would also have the flexibility to offer different programs in different cells. This would require different signal switching within the satellite payload. However, as long as the initial frequency plan provided adequate uplink bandwidth, there would be little or no regulatory impact to such a change in programming.

Figure 5:
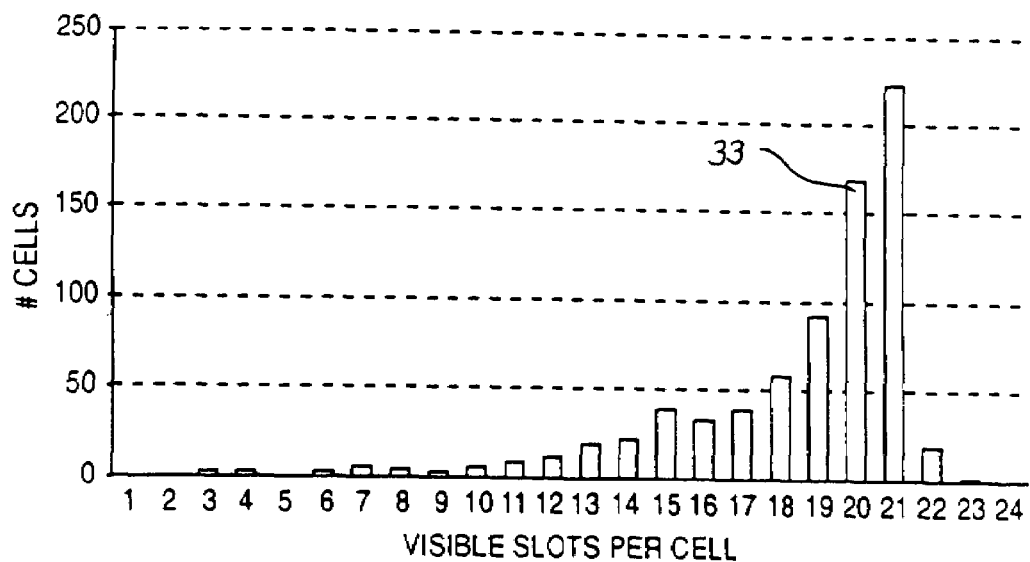
FIG. 5 is a histogram showing the number of cells of FIG. 4 that can be utilized from the given number of orbit slots, assuming an elevation angle of greater than 20°, and slots spaced 6° apart from −30° to +150° longitude.

Referring now to FIG. 5, a histogram showing the number of cells from FIG. 4 that can be utilized from the given number of orbit slots is illustrated. Two or more countries which share border cells may be served from different orbit slots, so that each country has complete coverage. The number of cells which can be seen from the given number of orbit slots is computed using a minimum elevation angle of 20°, and a slot spacing of 6° over a range of −30° to +150° longitude. If this number is less than the number of countries which the cell overlaps, then an orbit slot selection can be made that selects service to all of the countries overlapped. As is illustrated, a large number of cells are accessible from 10 or more slots. For example, there are 170 cells that may be served by 20 orbit slots (beams) as shown by 33.

Referring now to FIG. 6, a wedge-shaped 60° sector of a tiling pattern having a three-band reuse scheme 28 is shown with each cell 30 marked with a letter which denotes a portion of the available spectrum that differs from the others by frequency, polarization, or both. In implementation, the 60° sector illustrated would be extended six fold to encompass a circle centered around cell $A_0$. The other A frequencies, i.e., $A_{1-8}$, represent interference sources. The tiling pattern of frequency assignments is preferably continued across the applicable landmasses of part of the entire visible Earth.

Referring now to FIG. 7, a tiling pattern 28 of cells 30 is shown having a four-band reuse scheme. Only a 60° sector is illustrated as in FIG. 6. In this type of implementation, the interference between adjacent like frequencies would be decreased due to the increased distance between like cells.

Referring now to FIG. 8, a seven-band cell reuse scheme is established within tiling pattern 28. By using seven cells, interference is further reduced from the pattern shown in FIGS. 6 and 7 due to the increased distance between interference sources.

Provided that cells are sufficiently small, it has been calculated that interference over an area of a cell 30 is relatively constant. That is, because there are a large number of regularly distributed cell rings over an area as the measurement is moved from one side of the cell to the other, different cells become closer while others move further away.

If orbit slot spacing is large enough to provide adequate isolation, then a beam may be projected onto a cell from each orbit longitude. Isolation between beams from adjacent orbit slots is largely a function of Earth-station antenna size and the associated side lobe gain. For example, in a three-band scheme such as that shown in FIG. 6, if one orbit slot transmits the A channel set into a certain Earth-fixed cell, then the orbit slot 6° to the east, for example, may transmit frequency B channel into that same cell. Similarly, B cells may switch to C and C to A. If this scheme is followed, then a single cell may be fed from all accessible orbit slots. The same is true for four-band frequency reuse and seven-band frequency reuse.

Figure 9:
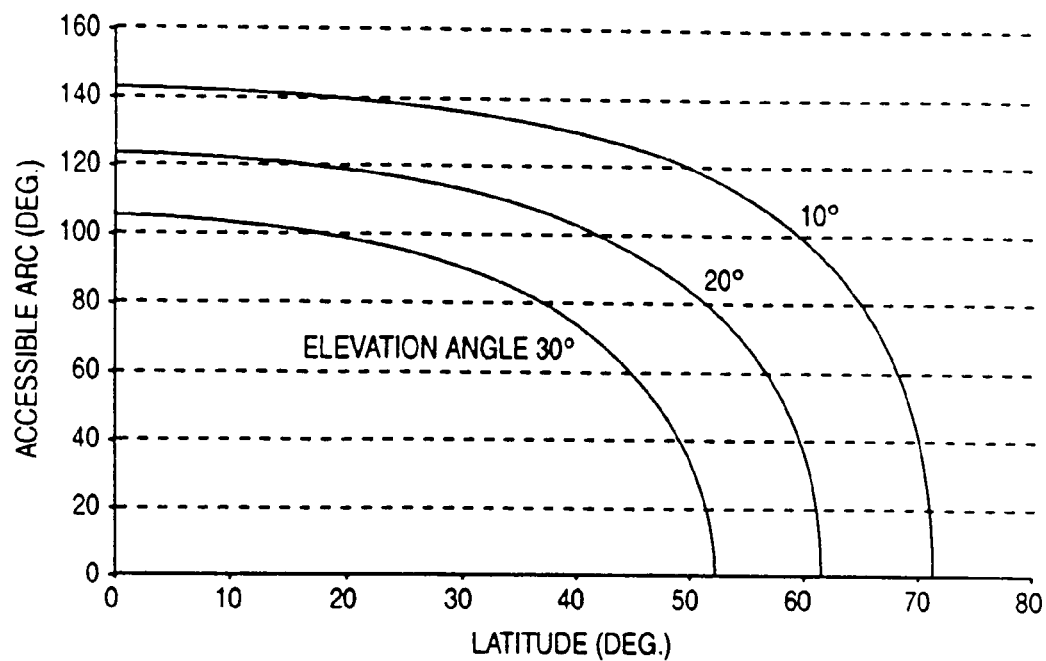
FIG. 9 is a plot of the accessible portion of the GSO arc versus cell latitude for three different Earth station elevation angles.

Referring now to FIG. 9, a plot of accessible GSO arc versus cell latitude plot is shown. Three lines are shown which define an elevation angle greater than 30°, greater than 20°, and greater than 10°. The number of orbit slots which can serve a particular cell is proportional to the length of the accessible arc. Therefore, the capacity available to a given cell is approximately the number of channels per beam times the length of the accessible arc divided by the orbit slot spacing, which may be 6° nominally. This corresponds to antenna size.

Figure 10:
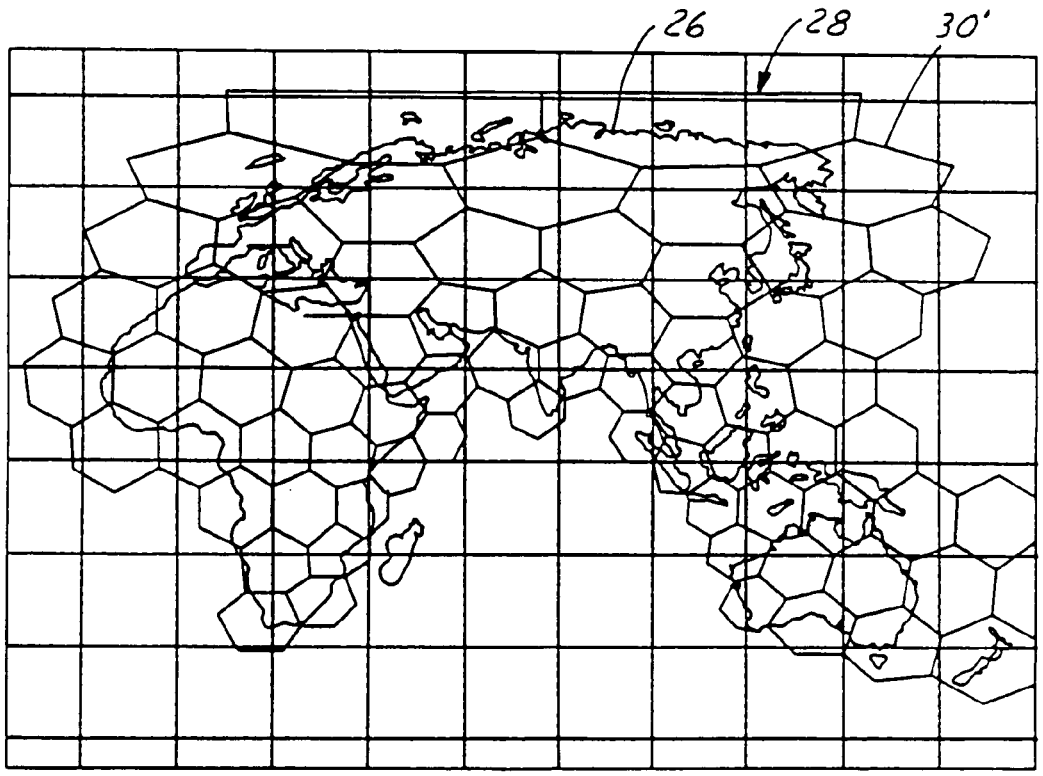
FIG. 10 is a map showing an alternative tiling pattern for 2° beams.

The tiling pattern illustrated in FIGS. 3 and 4 use cells with 0.5° beam angles. The size 0.5° is somewhat arbitrarily chosen, however. In FIG. 10, 2° beamwidth cells 30 are illustrated. As is shown, many fewer cells are required to cover the landmasses. However, 2° cells may not enable reuse to achieve the desired high capacity overall.

Larger cells decrease spacecraft antenna size since the size of the beams is reduced. Larger beams, however, cause orbit slot scarcity and complicate sharing of a spectrum between neighboring countries. Also, some capacity may be lost due to inefficient spectrum utilization.

In operation, the reference tiling pattern on the face of the Earth should first be defined common to all satellites participating in the system. Because of power limits on satellites, more than a single set can be implemented at each orbit location. The tiling pattern has a number of cells associated with it. A plurality of beams are generated from a first satellite. Each of the beams is directed to one of the cells. A second satellite in an adjacent slot generates a second plurality of beams also direct. For a beam covering given cells, the second satellite should use a frequency band different from the first satellite. This alternation of bands from different slots of the present invention reduces interference between satellites and increases spectrum utilization. This scheme enables the coordination of coverage among all satellites to achieve optimum capacity.

Thus, the relationships among the satellites of the present invention, including orbit slot spacing, common tiling patterns, and coordinated frequency reuse schemes, as well as antenna sizes and accepted interference levels enable a greatly increased utilization of the orbit/spectrum resource over that achieved by methods of coordination used in the current state of the art.

While particular embodiments of the invention have been shown and described, numerous variations and alternate embodiments will occur to those skilled in the art. Accordingly, it is intended that the invention be limited only in terms of the appended claims.

What is claimed is:

1. A system of geostationary satellite orbits coordinatable with a geostationary belt of satellite positions having a plurality of geostationary slots, said system comprising:
   a plurality of satellites forming a coordinatable system of geostationary satellite orbits that provides satellite coverage continuously within a specified service area;
   each satellite position being located in one of said plurality of geostationary slots and generating a plurality of beams in a respective group of cells; and
   a fixed tiling pattern for use on the surface of the Earth, said tiling pattern having a plurality of cells corresponding to said plurality of beams, each of said cells having a defined frequency for communication and a frequency reuse spacing, wherein at least one beam formed from a first of the plurality of satellites is directed to and coextensive with a group of cells formed from a second of the plurality of satellites so that at least one beam has a different frequency than each corresponding cell from the group of cells formed from the second of the plurality of satellites.

2. A system as recited in claim 1 further comprising a first satellite occupying a first geostationary slot generating a first set of uniform beams, and a second satellite occupying a second geostationary slot generating a second set of uniform beams.

3. A system as recited in claim 2 wherein said first set of beams and said second set of beams have a width of 0.5 degrees.

4. A system as recited in claim 1 wherein said cells have an area that is proportional to latitude on the surface of the Earth.

5. A system as recited in claim 1 wherein said tiling pattern is continuous.

6. A system as recited in claim 1 wherein a tiling pattern first set of parameters for forming a tiling pattern includes a reuse pattern.

7. A system as recited in claim 1 wherein said tiling pattern comprises a plurality of hexagons.

8. A satellite system as recited in claim 1 wherein said first orbital slot and said second orbital slot are coextensive.

9. A satellite system as recited in claim 1 wherein the first satellite and the second satellite form a fixed satellite service.

10. A satellite system as recited in claim 1 wherein the first satellite ad the second satellite form a broadcast satellite service.

11. A satellite system as recited in claim 1 wherein a first subset beams of the plurality of beams sharing a same frequency band have a substantially uniform signal power and a uniform C/(N+1) requirement, where C is an intended signal power, N is the noise power due to various natural thermal processes and I is a power due to all interfering signals occupying the same frequency band as the intended signal.

12. A satellite system as recited in claim 1 wherein the tiling pattern forms regularly distributed cell rings.

13. A satellite system as recited in claim 1 wherein forming a tiling pattern comprises forming the tiling pattern from regularly distributed cell rings.

14. A method of operating a satellite system comprising the steps of:
   defining a fixed tiling pattern for use on the surface of the Earth having a number of cells;
   generating a first set of beams from a first satellite, each of the beams directed to a first group of the cells;
   generating a second set of beams from a second satellite, each of the beams in said second set of beams directed to a second group of the cells, wherein at least one of the beams from the second set of beams is directed to and coextensive with one in the first group of cells; and
   coordinating coverage from said first set of beams and said second set of beams to avoid interference between the first set of beams and the second set of beams by assigning a frequency to the at least one of the beams from the second set of beams that has a different frequency than each corresponding cell formed from the first set of beams.

15. A satellite system comprising:
   a plurality of orbit slots having a first orbit slot and a second orbit slot;
   a fixed tiling pattern for use on the surface of the Earth, said tiling pattern having a plurality of cells, each of said cells having a defined frequency for communication;
   a first satellite occupying a first orbit slot generating a first set of beams directed to a first group of the plurality of cells;
   a second satellite occupying a second orbital slot generating a second set of beams directed to a second group of cells, wherein at least one of the beams from the second set of beams is directed to and coextensive with one in the first group of cells; and
   said first set of beams and said second set of beams being generated according to predetermined parameters to avoid interference between said first set and said second set of beams by assigning a frequency to the at least one of the beams from the second set of beams that has a different frequency than each corresponding cell formed from the first set of beams.

* * * * *